United States Patent [19]

Kunzel et al.

[11] 4,111,920

[45] Sep. 5, 1978

[54] POLYETHER URETHANES AS ANTISTATIC ADDITIVES IN POLYAMIDE COMPOSITIONS

[75] Inventors: Hans Egon Künzel, Dormagen; Francis Bentz, Cologne, both of Germany

[73] Assignee: Bayer Aktiengesellschaft, Leverkusen, Germany

[21] Appl. No.: 680,668

[22] Filed: Apr. 27, 1976

[30] Foreign Application Priority Data

Apr. 30, 1975 [DE] Fed. Rep. of Germany ....... 2519259
Apr. 30, 1975 [DE] Fed. Rep. of Germany ....... 2519260

[51] Int. Cl.$^2$ ................. C08L 77/00; C08L 77/02; C08L 77/04
[52] U.S. Cl. ................................ 526/6; 260/858; 428/85; 560/24
[58] Field of Search ..................... 260/78 S, 78 R

[56] References Cited

U.S. PATENT DOCUMENTS 3,428,710  2/1969  Daumiller et al. ................. 260/78 S Primary Examiner—Harold D. Anderson
Attorney, Agent, or Firm—Plumley and Tyner

[57] ABSTRACT

The present invention relates to new polyether urethanes corresponding to the general formula

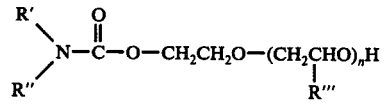

and to a process for their production.

The polyether urethanes are stable for prolonged periods at temperatures of up to approximately 300° C in aliphatic polyamide melts, and polyamides containing urethanes of this kind, more especially filaments and fibers of such polyamides or woven fabrics, knitted fabrics, nonwovens or pile fabrics produced from these filaments or fibers, show excellent antistatic properties.

5 Claims, No Drawings

POLYETHER URETHANES AS ANTISTATIC ADDITIVES IN POLYAMIDE COMPOSITIONS

This invention relates to polyether urethanes, their production and their use as antistatic additives and to permanently antistatic polyamide compositions which may be processed into permanently antistatic filaments, fibers, films and other shaped articles.

It is known from DT-OS No. 1,768,058 and from U.S. Pat. No. 3,658,882 that fibers, woven fabrics, knitted fabrics and films of polyamides can be given an antistatic finish by a surface treatment with polyethers containing urethane groups. Unfortunately, one disadvantage of this process is that the antistatic finish is not washproof. The effectiveness of the antistatic finish can be eliminated almost completely by a single wash. On the other hand, these known antistatically active polyether urethanes cannot be incorporated into the polyamides on account of their inadequate temperature stability. It has now been found that the above-mentioned disadvantages are avoided by new polyalkylene ethers with secondary urethane groups corresponding to the general formula (I):

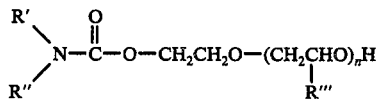

in which
R' and R" independently of one another represent a member selected from the group consisting of a straight chain, cyclic or branched, saturated or unsaturated aliphatic hydrocarbon radical, a straight-chain, cyclic or branched, saturated or unsaturated aliphatic hydrocarbon radical containing hetero atoms, an aralkyl radical, an aromatic radical and an alkyl-substituted aromatic radical, at least one of the two radicals R' and R" comprising an alkyl radical with from 10 to 30 carbon atoms,
R'" represents a member selected from the group consisting of hydrogen atom, an alkyl group with from 1 to 5 carbon atoms, a cycloalkyl, an arylalkyl and an aralkyl group, and
$n$ is a number of at least 3, preferably from 7 to 45,
are stable for prolonged periods at temperatures of up to approximately 300° C in aliphatic polyamide melts, and that polyamides containing urethanes of this kind, more especially filaments and fibers of such polyamides or woven fabrics, knitted fabrics, nonwovens or pile fabrics produced from these filaments or fibers, show excellent antistatic properties.

Accordingly, the present invention relates to new polyether urethanes corresponding to the general formula (I):

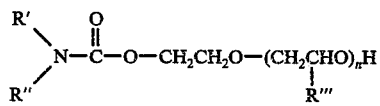

in which
R', R", R'" and $n$ are as defined above,
R'" preferably representing a hydrogen atom.

Perlon is Registered Trademark 665,877 in the name of Warenzeichenverband E. V. a German Association covering nylon fibers, filaments, etc. made by members of the Association and as is known by those skilled in the art it includes polyamide-6 or nylon-6 or polycaprolactam such as described in Example 1.

The straight-chain, cyclic or branched, saturated or unsaturated hetero atoms containing aliphatic hydrocarbon radical mentioned in formula I contains preferably oxygen or nitrogen.

The invention also relates to a process for the production of polyether urethanes wherein a secondary amine corresponding to the formula

in which
R' and R" independently of one another represent a member selected from the group consisting of a straight chain, cyclic or branched, saturated or unsaturated aliphatic hydrocarbon radical, a straight-chain, cyclic or branched, saturated or unsaturated aliphatic hydrocarbon radical containing hetero atoms, an aralkyl radical, an aromatic radical and an alkyl-substituted aromatic radical,
at least one of the two radicals R' and R" comprising an alkyl radical containing from 10 to 30 carbon atoms, is reacted with glycol carbonate and the reaction product obtained is alkoxylated with an alkylene oxide or with glycol carbonate.

More specifically, the polyalkylene ethers containing a urethane group according to the invention may be prepared as follows:

A secondary amine is initially reacted with glycol carbonate either in the melt or in an inert solvent to form the corresponding urethane with a free OH-group. The secondary amine and glycol carbonate are used in a molar ratio of 1:1. It is of course also possible to use an excess, preferably a 10% by weight excess, of glycol carbonate. In this case, the excess of glycol carbonate is removed in vacuo on completion of the reaction which is carried out under nitrogen at a temperature of about 60° to 150° C. Suitable inert organic solvents are, for example, toluene, xylene, o-di-chlorobenzene, etc. The urethane is alkoxylated either with an alkylene oxide, such as ethylene oxide or propylene oxide, or in the presence of glycol carbonate.

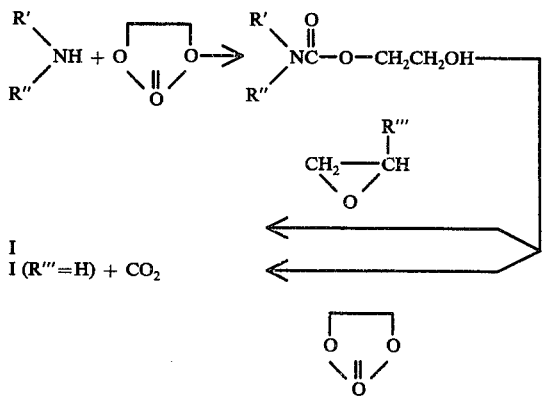

In the latter case $CO_2$ is eliminated. This reaction is preferably carried out in the presence of about 1% by weight of lithium chloride. However, it is particularly advantageous to carry out alkoxylation with alkylene oxide because, in cases where glycol carbonate is used, any carbonate groups occurring in the polyether chain can lead to secondary reactions where the glycol carbonate is added before or during polycondensation.

Cyclic carbonates of glycols react readily with primary amines to form oxyurethanes (A. Einhorn, E. Lindenberg, A. 300, 141 (1898)). With glycol carbonate, the amines undergo oxyethylation at elevated temperatures, the reaction being accompanied by the elimination of carbon dioxide (Houben-Weyl, Vol. 9, page 109; German Patent Application J. 75 685 (1943), I.G. Farbenindustrie A.G.). If, by contrast, secondary amines are reacted with glycol carbonate, temperature-stable oxyurethanes are obtained and may readily be reacted with alkylene oxides, such as ethylene oxide or propylene oxide. The polyether urethanes obtained do not undergo any thermal degradation when added before, during or after polycondensation.

Suitable secondary amines are N-methylstearylamine, N-methylcetylamine, N-ethylstearylamine, N-butylstearylamine, N-propylcetylamine, N-methylmyristylamine, N-butylmyristylamine, distearylamine, dicetylamine and dimyristylamine.

Alkoxylation of the oxyurethane with alkylene oxides is preferably carried out under nitrogen in the melt at temperatures between 50° and 180° C and optionally in the presence of from 0.1 to 1% by weight, based on the quantity by weight of oxyurethane, of basic catalysts, such as NaOH.

The invention also relates to the use of the polyether urethanes according to the invention as antistatically active additives to polyamides.

The present invention also relates to antistatic polyamide compositions containing from 0.5 to 15% by weight and preferably from 1.5 to 10% by weight, based on the composition as a whole, of urethanes containing ether groups of the general formula (I):

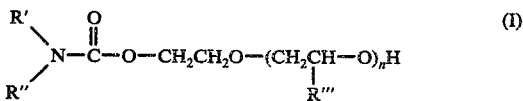

in which R', R", R'" and $n$ are as defined above, R'" preferably representing a hydrogen atom.

Finally, the invention also relates to shaped articles produced from these antistatic polyamide compositions, more especially antistatic fibers, filaments and films, and also to woven fabrics, knitted fabrics, nonwovens, pile fabrics or similar sheet-form materials produced from these antistatic fibers or filaments.

To produce the antistatic polyamide compositions, the urethanes containing ether groups according to the invention are introduced into and intensively mixed with the polyamide melt before the polyamides are spun or extruded, or the urethanes are applied to solid, granulated polyamide which is then melted, intensively mixed and spun or extruded, or the urethanes containing ether groups used in accordance with the invention are introduced into the polymerisation or polycondensation mixtures before, during or after production of the polyamides, after which the antistatic polyamide may either be directly spun or is first processed into a granulate which may then be further processed in known manner.

Above all, the new antistatic polyamide compositions have the advantage that the antistatic properties are made washproof by an aftertreatment, more especially by fixing in hot air or saturated steam at temperatures of around 100° C or higher.

Shaped articles, more especially antistatic fibers, filaments and films, may be produced from the antistatic polyamide compositions and may be further processed into woven fabrics, knitted fabrics, nonwovens, pile fabrics or similar sheet-form materials.

The antistatic polyamide compositions may contain fillers and/or pigments.

The polyalkylene glycol ethers containing a secondary urethane group are suitable for use as additives for any meltable aliphatic polyamides, but especially for poly-$\epsilon$-caproic acid amides.

The antistatic properties of the polyamide compositions according to the invention are reflected in a distinct reduction in their electrical surface resistance, as measured in accordance with DIN 54 345 on fibers, filaments or sheet-form materials.

Reaction of N-methylstearylamine with glycol carbonate:

97 parts by weight of glycol carbonate are introduced in portions at 100° C into 283 parts by weight of N-methylstearylamine, followed by stirring for 4 hours at that temperature. On completion of the reaction, the excess glycol carbonate is distilled off at 95° to 105° C/11 mm. The yield of oxyurethane amounts to 97% by weight.

| Analysis: | C % | H % | N % |
|---|---|---|---|
| calculated: | 71.2 | 12.1 | 3.8 |
| observed | 72.0 | 12.6 | 3.9 |
|  | 71.5 | 12.4 | 3.8 |

EXAMPLE 1

(a) Preparation

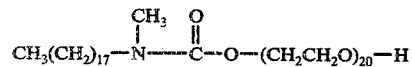

220 parts by weight of ethylene oxide are introduced at 80° C into 92 parts by weight of the oxyurethane prepared as described above in the presence of 1 part by weight of NaOH. The temperature is increased slowly to 100° C, followed by stirring for 1 hour at that temperature. The volatile constituents are distilled off in vacuo. The yield amounts to 287 parts by weight. OH-number: 45.

(b) Preparation of the antistatic polyamide composition 130 parts by weight of $\epsilon$-caprolactam and 15 parts by weight of $\epsilon$-aminocaproic acid are condensed for 3 hours under nitrogen at 270° C. 7.52 parts by weight of the polyether urethane prepared in accordance with Example 1(a) are then added to the polyamide melt at the above temperature. After heating for 1 hour at 270° C, the polyamide is spun into filaments which show the following electrical surface resistances, as measured in accordance with DIN 54 345:

after the 1st wash : $5 \cdot 10^{10} \Omega \cdot cm^2$
after the 5th wash : $4 \cdot 10^{10} \Omega \cdot cm^2$
after the 10th wash : $4 \cdot 10^{10} \Omega \cdot cm^2$ Polycaprolactam without the antistatic additive has a surface resistance of about $5 \cdot 10^{12} \Omega \cdot cm^2$ after only the 1st wash.

EXAMPLE 2

150 parts by weight of Perlon chips are melted, followed by the addition of 7.5 parts by weight of the polyether urethane produced in accordance with Example 1(a). After heating with stirring under nitrogen for 3 hours at 270° C, the polyamide composition obtained was spun into filaments on which the following electrical surface resistances were measured:

after the 1st wash : 3 . $10^{10}$ Ω . cm²
after the 5th wash : 6 . $10^{10}$ Ω . cm²
after the 10th wash : 4 . $10^{10}$ Ω . cm²

EXAMPLE 3

(a) Preparation of

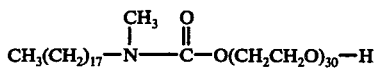

371 parts by weight of the oxyurethane prepared as described above are heated to 80° – 100° C in the presence of 2 parts by weight of NaOH, followed by the introduction of 1400 parts by weight of ethylene oxide. This is followed by stirring for 2 hours at a temperature of 100° to 120° C. After the volatile constituents have been distilled off in vacuo, the required product is obtained in a yield of 1300 parts by weight. OH-number: 33.

(b) 150 parts by weight of Perlon chips are melted. 7.5 parts by weight of the polyether urethane prepared in accordance with Example 3(a) are added to the resulting melt, followed by heating with stirring under nitrogen for another 3 hours at a temperature of 270° C. The polyamide melt obtained was spun into filaments on which the following electrical surface resistances were measured:

after 1st wash : 4 . $10^{10}$ Ω . cm²
after 5th wash : 4 . $10^{10}$ Ω . cm²
after 10th wash : 5 . $10^{10}$ Ω . cm²

EXAMPLE 4

(a) Preparation of

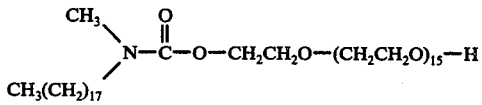

165 parts by weight of ethylene oxide are introduced at 80° C into 92 parts by weight of the oxyurethane prepared as described above in the presence of 1 part by weight of NaOH. The temperature is increased slowly to 100° C, followed by stirring for 1 hour at that temperature. The volatile constituents are then distilled off in vacuo. The yield amounts to 253 parts by weight. OH-number: 54.

(b) Preparation of the antistatic polyamide compositions 150 parts by weight of Perlon chips are melted, followed by the addition of 7.5 parts by weight of the polyether urethane prepared in accordance with Example 4(a). After heating with stirring under nitrogen for 3 hours at 270° C, the highly viscous polyamide mass obtained is spun into filaments on which the following electrical surface resistances were measured:

after the 1st wash : 4 . $10^{10}$ Ω . cm²
after the 5th wash : 5 . $10^{10}$ Ω . cm²
after the 10th wash : 5 . $10^{10}$ Ω . cm²

EXAMPLE 5

(a) Preparation of

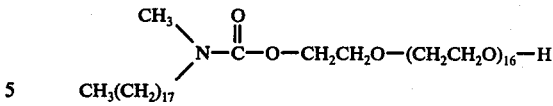

330 parts by weight of glycol carbonate and 5 parts by weight of lithium chloride are initially introduced into a reaction vessel at 110° C. 92 parts by weight of the oxyurethane are then introduced in portions at the same temperature. The temperature is increased slowly to 200° C, followed by stirring at that temperature until there is no further evolution of $CO_2$. This is the case after 20 hours. The yield amounts to 181 parts by weight. OH-number: 50.

(b) Production of the antistatic polyamide composition 150 parts by weight of Perlon chips are melted, followed by the addition of 7.5 parts by weight of the polyether urethane prepared in accordance with Example 5(a). After stirring under nitrogen for 3 hours at 270° C, the resulting polyamide mass is spun into filaments on which the following electrical surface resistances were measured:

after the 1st wash : 5 . $10^{10}$ Ω . cm²
after the 5th wash : 8 . $10^{10}$ Ω . cm²
after the 10th wash : 8 . $10^{10}$ Ω . cm²

EXAMPLE 6

(a) Preparation of

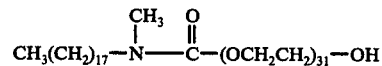

92 parts by weight of the oxyurethane are added in portions at 110° C to 660 parts by weight of glycol carbonate and 5 parts by weight of lithium chloride. The temperature is slowly increased to 200° C. Stirring is continued until there is no further evolution of $CO_2$. The reaction is over after about 30 hours. The yield amounts of 260 parts by weight. OH-number: 33.1.

(b) Production of the antistatic polyamide composition 150 parts by weight of Perlon chips are melted, followed by the addition of 7.5 parts by weight of the polyether urethane prepared as described above. After stirring under nitrogen for 3 hours at 270° C, the resulting polyamide mass is spun into filaments on which the following electrical surface resistances were measured:

after the 1st wash : 6 . $10^{10}$ Ω . cm²
after the 5th wash : 7 . $10^{10}$ Ω . cm²
after the 10th wash : 9 . $10^{10}$ Ω . cm²

We claim:

1. Antistatic composition consisting essentially of an aliphatic polycarbonamide and, as an antistatic additive, from 0.5 to 15% by weight of the whole composition of a polyalkylene glycol ether with secondary urethane groups corresponding to the general formula:

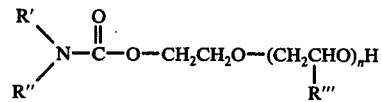

in which

R' and R" independently of one another represent a member selected from the group consisting of a straight chain, cyclic or branched, saturated or unsaturated aliphatic hydrocarbon radical, an aralkyl radical and an alkyl-substituted aromatic radical, at least one of the two radicals R' and R" is an alkyl radical with from 10 to 30 carbon atoms, R'" represents a member selected from the group consisting of hydrogen atom, an alkyl group with from 1 to 5 carbon atoms, a cycloalkyl, an arylalkyl and an aralkyl group, and n is a number of 3 to 45.

2. Antistatic polyamide composition as claimed in claim 1 wherein the antistatic additive has the formula:

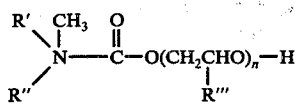

in which one of the two radicals R' and R" is a methyl, ethyl, propyl or butyl radical, whilst the other radical is a stearyl, cetyl or myristyl radical.

3. Antistatic polyamide composition as claimed in claim 1, wherein the antistatic additive has the formula:

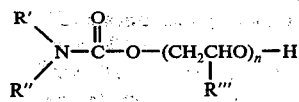

in which both radicals R' and R" represent a stearyl, cetyl or myristyl radical.

4. Antistatic polyamide composition as claimed in claim 1 wherein the antistatic additive has the formula:

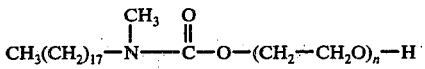

in which $n$ is a number of 4 to 45.

5. A fiber composition of claim 1.

* * * * *